(12) United States Patent
Elwell

(10) Patent No.: US 7,201,415 B2
(45) Date of Patent: Apr. 10, 2007

(54) METHOD AND APPARATUS FOR APPLYING A DECORATIVE DESIGN TO A DOOR HANDLE

(75) Inventor: James P. Elwell, Johnston, IA (US)

(73) Assignee: Putco, Inc., Story City, IA (US)

( * ) Notice: Subject to any disclaimer, the term of this patent is extended or adjusted under 35 U.S.C. 154(b) by 0 days.

(21) Appl. No.: 11/085,406

(22) Filed: Mar. 21, 2005

(65) Prior Publication Data
US 2006/0125263 A1 Jun. 15, 2006

Related U.S. Application Data

(63) Continuation-in-part of application No. 11/011,347, filed on Dec. 14, 2004.

(51) Int. Cl.
*B60J 11/06* (2006.01)

(52) U.S. Cl. .................................................. 296/1.08

(58) Field of Classification Search ............... 296/1.08, 296/21; 40/591, 597; D8/322; D12/178, D12/190, 195, 196
See application file for complete search history.

(56) References Cited

U.S. PATENT DOCUMENTS

| | | | | | |
|---|---|---|---|---|---|
| D169,698 | S | * | 5/1953 | Rogers | D8/322 |
| 3,230,653 | A | * | 1/1966 | Rice | 40/591 |
| 3,670,438 | A | * | 6/1972 | Carroll et al. | 40/600 |
| 3,869,332 | A | * | 3/1975 | Loew | 428/31 |
| 4,707,008 | A | * | 11/1987 | Falco | 293/128 |
| 4,825,673 | A | * | 5/1989 | Drake | 70/455 |
| 5,088,781 | A | * | 2/1992 | Ono et al. | 292/347 |
| 5,131,177 | A | * | 7/1992 | Sy, Jr. | 40/593 |
| 5,255,464 | A | * | 10/1993 | Marecek | 40/591 |
| 5,740,557 | A | * | 4/1998 | Reid et al. | 2/209.13 |
| 5,786,046 | A | * | 7/1998 | Ott | 428/31 |
| 5,985,382 | A | * | 11/1999 | Shuen | 428/31 |
| 6,106,912 | A | * | 8/2000 | Balog | 428/31 |
| 6,217,958 | B1 | * | 4/2001 | Blyden et al. | 428/31 |
| 6,295,945 | B1 | * | 10/2001 | Amanze | 116/173 |
| 6,412,145 | B1 | * | 7/2002 | Rubel | 16/412 |
| 6,463,686 | B1 | * | 10/2002 | Eisenbraun | 40/591 |
| 6,484,427 | B1 | * | 11/2002 | Santa Cruz et al. | 40/591 |
| 6,553,697 | B1 | * | 4/2003 | Pichan | 40/591 |
| 6,592,240 | B2 | * | 7/2003 | Camarota et al. | 362/399 |
| 6,626,473 | B1 | * | 9/2003 | Klein et al. | 292/347 |
| 6,740,834 | B2 | * | 5/2004 | Sueyoshi et al. | 200/600 |

(Continued)

OTHER PUBLICATIONS

1979 Oldsmobile Cutlass Cruiser advertisement.*

(Continued)

*Primary Examiner*—D. Glenn Dayoan
*Assistant Examiner*—Greg Blankenship
(74) *Attorney, Agent, or Firm*—McKee, Voorhees & Sease, P.L.C.

(57) ABSTRACT

The current invention relates to a decorative design member or logo configured to affix to an existing vehicle door handle. Additionally, the current invention relates to a handle overlay configured to an existing vehicle door handle and a decorative design member affixed to the handle overlay. Furthermore, the decorative design member can be integrated into a handle overlay for the current invention. The invention also relates to a method for applying a decorative design member, logo or handle overlay to a vehicle door handle.

10 Claims, 5 Drawing Sheets

U.S. PATENT DOCUMENTS

| | | | |
|---|---|---|---|
| 6,749,250 B1 * | 6/2004 | Reid | 296/136.07 |
| 6,769,154 B1 * | 8/2004 | Klein et al. | 16/412 |
| 6,789,833 B1 * | 9/2004 | Alber | 296/57.1 |
| 6,929,294 B2 * | 8/2005 | Byrla et al. | 292/336.3 |
| 2002/0021459 A1 * | 2/2002 | McAbee | 359/1 |
| 2003/0122357 A1 * | 7/2003 | Rhue | 280/770 |
| 2003/0122556 A1 * | 7/2003 | Sueyoshi et al. | 324/686 |
| 2004/0134108 A1 * | 7/2004 | Harari | 40/600 |

OTHER PUBLICATIONS late 1970s-early 1980s Oldsmobile Cutlass Cruiser picture.*

Vinyl Logo Car Magnet, ebay, http://www.cgi.ebay.com/ws/eBayISAPI.dll?ViewItem&item=180014120530&category=25216.*

Virginia Tech Football Car Magnet, High Peak Sportswear, http://www.collegegear.com/sf/stores/1096/p-43136.shtml.*

1977-88 Oldsmobile 98 Drivers Side Exterior Door Handle, 1A Auto, http://www.1aauto.com/1A/ExteriorTrim/Oldsmobile/98/PLP1090030/349861&ovchn=OTHER&ovcpn=MSM&ovcrn=&ovtac=CMP.*

* cited by examiner

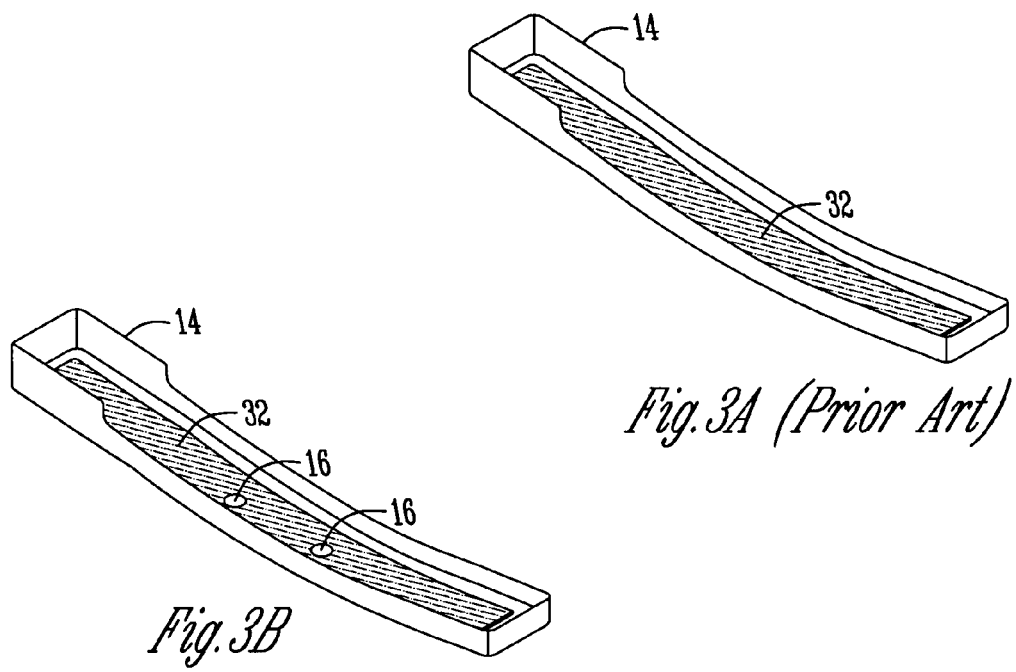
Fig. 3A (Prior Art)
Fig. 3B
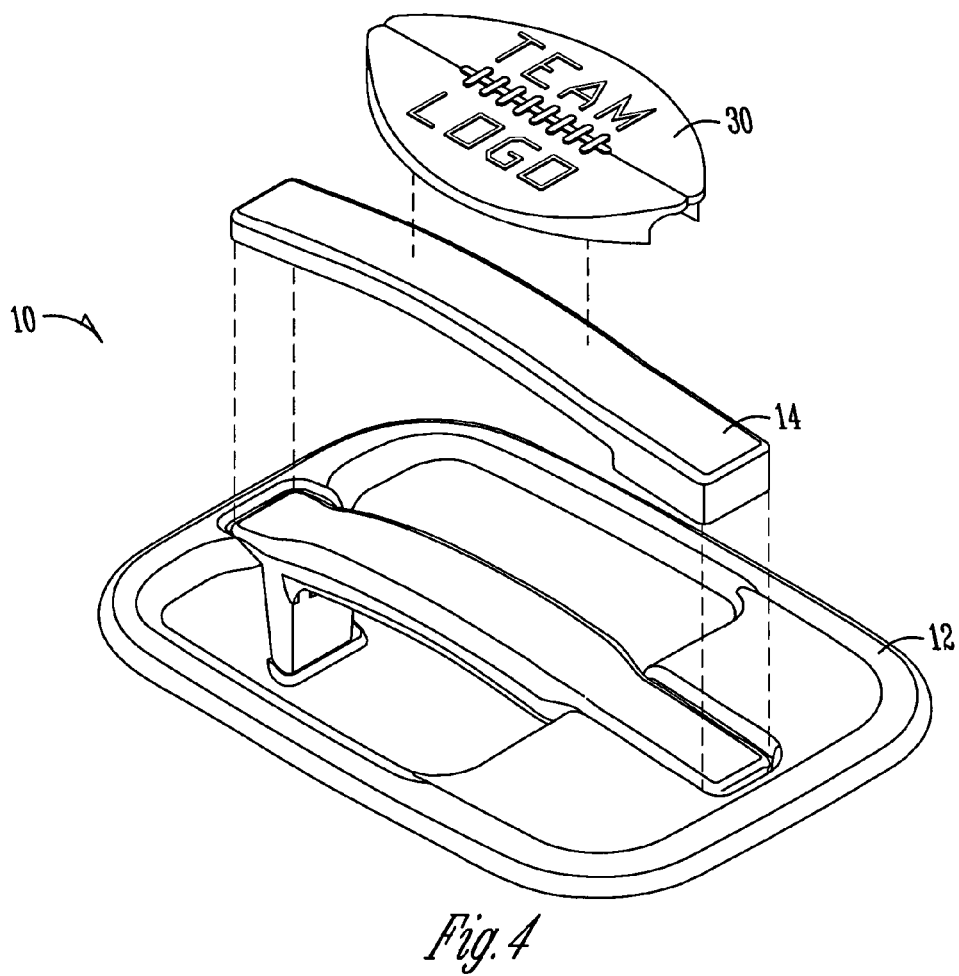
Fig. 4

METHOD AND APPARATUS FOR APPLYING A DECORATIVE DESIGN TO A DOOR HANDLE

CROSS-REFERENCE TO RELATED APPLICATIONS

This application is a continuation-in-part application of U.S. application Ser. No. 11/011,347 filed on Dec. 14, 2004, which is herein incorporated by reference in its entirety.

BACKGROUND OF THE INVENTION

This invention relates to after market trim devices for automobiles. Specifically, the invention relates to a method and apparatus for applying a decorative design to a door handle.

After market trim devices for automobiles are trim pieces which can be added to an automobile to add decoration and customization to a vehicle beyond what is supplied by the vehicle manufacturer. Today it is common to add after market trim pieces to vehicle door handles 12 such as the vehicle door assembly 10 shown in FIG. 1. To apply after market trim to such a door handle 12, one simply takes a handle overlay 14 as is shown in FIG. 2 and applies it to the door handle 12. This can be accomplished when the handle overlay 14 is manufactured to fit onto specific door handles 12 with a tight fit and with the use of double-sided tape inside the handle overlay 14 which when pressed tightly with the handle 12, sticks the handle overlay 14 to the handle 12. The double-sided tape 32 can be seen on the backside of the handle overlay 14 in FIG. 3A.

This type of handle overlay 14 is usually chromed or colored in a plain fashion. However, some customizers of the vehicles may wish to add more decoration and design to their vehicles. Therefore, it is desirable to have a method and apparatus for applying more decoration to the vehicle handle or handle overlays so that one can further customize one's vehicle.

The primary objective of the present invention is to provide an improved method and apparatus for applying a decorative design member to a door handle.

Another object of the present invention is to allow individuals to easily customize their vehicle by adding after market decorative designs as trim on their vehicles.

A further object is a provision of the method and apparatus for applying a decorative design member to a door handle which is economical to manufacture, durable in use, and efficient in operation.

One or more of these or other objects of the invention will be apparent from the specification and claims that follow.

SUMMARY OF THE INVENTION

The foregoing may be achieved by an aftermarket vehicle trim piece comprising a decorative design member configured to affix to an existing vehicle door handle.

The foregoing may also be achieved by a vehicle trim piece comprising a decorative design having a first and a second opposite surfaces and one or more holes extending through the decorative design from the first surface to the second surface, the decorative design member secured to a vehicle handle with fasteners through at least one or more holes in the decorative design member.

The foregoing may also be achieved by a method of applying a decorative design member or a logo to a vehicle door handle comprising the steps of applying an adhesive to the design member and pressing the design member to the vehicle door handle.

The foregoing objects may also be achieved by a vehicle handle cover comprising a handle overlay configured to affix to an existing vehicle door handle and a decorative design member affixed to the handle overlay.

A further feature of the present invention involves a vehicle handle cover comprising a handle overlay wherein the decorative design member is a logo.

A further feature of the present invention involves a vehicle handle cover comprising a handle overlay wherein a decorative design member is integral with the handle overlay.

A further feature of the present invention involves a vehicle handle cover wherein a handle overlay is affixed to an existing vehicle door handle by a connecting member selected from the group essentially consisting of double-sided tape, adhesive, glue, bonding agent, cured resin, fusing, welding, screws, bolts, pins, and rivets.

A further feature of the present invention involves a vehicle handle cover wherein a decorative design member is affixed to a handle overlay by a connecting member selected from the group consisting of double-sided tape, adhesive, glue, bonding agent, cured resin, fusing, welding, screws, bolts, pins, and rivets.

A further feature of the present invention involves a vehicle handle cover configured to affix to a vehicle door handle which is part of a vehicle, the part selected from the group consisting essentially of a door, a trunk, a tailgate, a hatch, a hood, a storage box, or a top.

A further feature of the present invention involves a vehicle handle cover configured to affix to a vehicle door handle wherein two or more decorative design members are affixed to a single handle overlay.

The foregoing objects may also be achieved by a vehicle handle cover comprising a handle overlay having a first and second opposite surfaces and one or more holes extending through the handle overlay from the first surface to the second surface, a decorative design member having one or more pins extending therefrom and extending through the one or more holes respectively in the handle overlay, the one or more pins each being secured within at least one of the one or more holes in the handle overlay and securing the decorative design member over the second surface of the handle overlay.

A further feature of the present invention involves a vehicle handle cover comprising a securing member on at least one pin of a design member or logo, the securing member including an enlarged or deformed portion of one or more of the pins, preventing the pins from passing through the hole each of the pins extends through in a handle overlay.

A further feature of the present invention involves a vehicle handle cover further comprising a securing member on at least one pin, each of the securing members comprising a separate member attached to the tip of each of one or more pins.

A further feature of the present invention involves a vehicle handle cover comprising an attachment material between a handle overlay and a manufacturer's door handle wherein the attachment material is selected from the group consisting essentially of tape, adhesive, bonding agent, or cured resin.

The foregoing objects may also be achieved by a method for applying a cover to a vehicle door handle comprising the steps of taking a decorative design member and affixing the decorative design member to a handle overlay, wherein the handle overlay is configured to affix to the vehicle door handle, and affixing the handle overlay to a vehicle door handle.

A further feature of the present invention involves a method for applying a cover to a vehicle door handle further comprising a step of affixing a logo to a decorative design member.

The foregoing objects may also be achieved by a method for applying a cover to a vehicle door handle comprising the steps of taking a decorative design member and affixing the decorative design member to a handle overlay, wherein the handle overlay is configured to affix to a vehicle door handle, and affixing the handle overlay to a vehicle door handle.

The foregoing objects may also be achieved by a method for applying a cover to a vehicle manufacturer's door handle comprising taking a decorative design member having one or more pins extending therefrom and an overlay having a first surface and a second surface and one or more holes extending through the overlay from the first surface to the second surface, extending each of the one or more pins of the design member through one of the one or more holes in the overlay, securing the pins within the one or more holes of the overlay, and thereby securing the decorative design member to the first surface of the overlay, and attaching an overlay with the design member secured thereto in covering relation with the manufacturer's door handle.

The current invention relates to attaching decorative design members and logos to a handle overlay for use on automobile door handles. The vehicle door handles in consideration in this application include but are not limited to handles for opening a door, a trunk, a tailgate, a hatch, a hood, a storage box, or a top.

A handle overlay is generally a device which is molded plastic or stamped metal which is designed to custom fit over an existing vehicle handle so as to fit tightly and not to interfere with the operation of the handle. The device is used for a decoration or trim to the existing vehicle handle.

The decorative design members referred to in this invention can refer to decorative designs that are either generic and do not specifically refer to specific entities, or are logos which specifically identify certain entities such as but not limited to, universities, sports teams, name brands, and the like.

BRIEF DESCRIPTION OF THE DRAWINGS

FIG. 3A shows the backside of a prior art handle overlay which is affixed to a door handle by the use of double sided tape.

FIG. 3B shows the backside of a handle overlay with holes through the handle overlay to allow for mounting of a decorative design member to the handle overlay.

FIG. 4 shows how a decorative design member mates to a handle overlay which in turn mates to an existing vehicle door handle.

DETAILED DESCRIPTION OF THE PREFERRED EMBODIMENT

Figure 1:
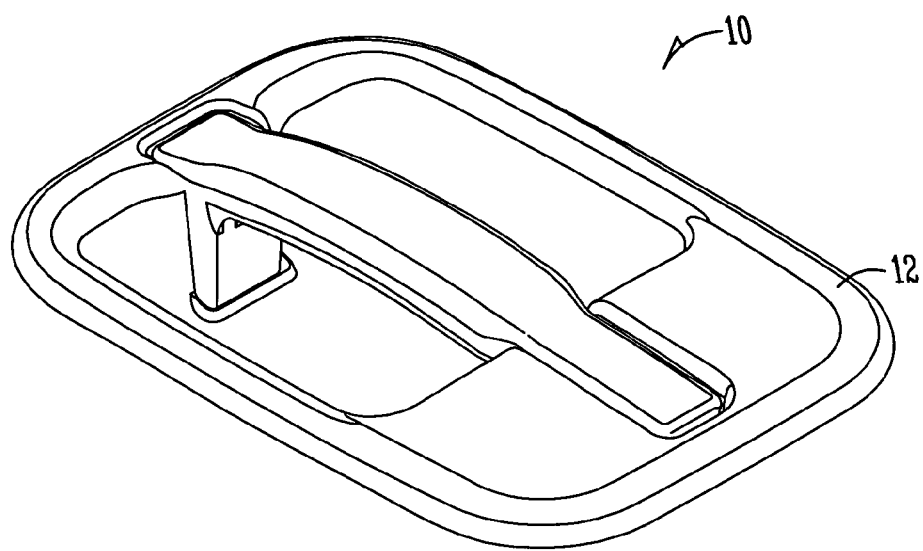
FIG. 1 shows a prior art vehicle door handle assembly.

FIG. 1 shows a typical vehicle door handle assembly 10 with a vehicle door handle 12. As discussed above, the vehicle door handle 12 contemplated by the current invention can be a handle used for opening any part of a vehicle including but not limited to the vehicle door, trunk, tailgate, hatch, hood, storage box, or a top.

Figure 2:
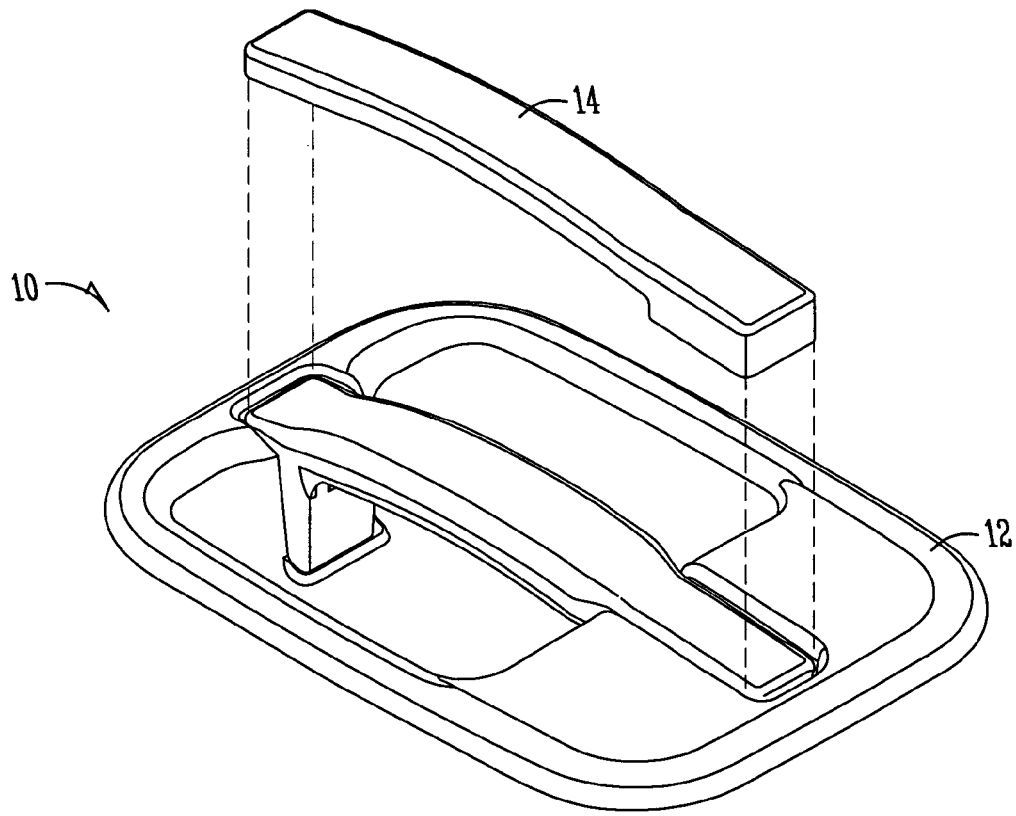
FIG. 2 shows a prior art vehicle door handle using a handle overlay.

FIG. 2 shows a vehicle door assembly 10 with the door handle 12 and a handle overlay 14, which is custom configured to mate with the specific door handle 12.

A handle overlay 14 typically mounts to door handle 12 by the use of double-sided tape 32 shown in FIG. 3A.

One embodiment of the current invention is shown in FIG. 4. FIG. 4 shows a decorative design member 30 configured as a logo and further configured to affix to a handle overlay 14. Once the decorative design member 30 is affixed to a handle overlay 14 it appears as it does in FIG. 5. Once again, the decorative design member configured as a logo can be any recognizable symbol which relates to things such as but not limited to universities, sports teams, name brands, or the like.

Figure 4A:
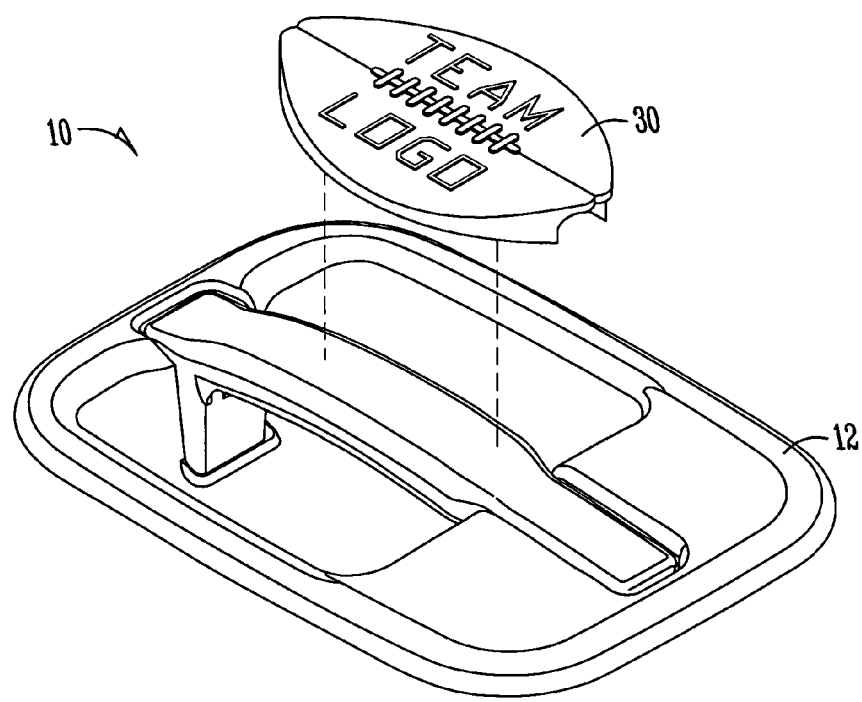
FIG. 4A shows how a logo decorative design member mates to an existing vehicle door handle.
Figure 4B:
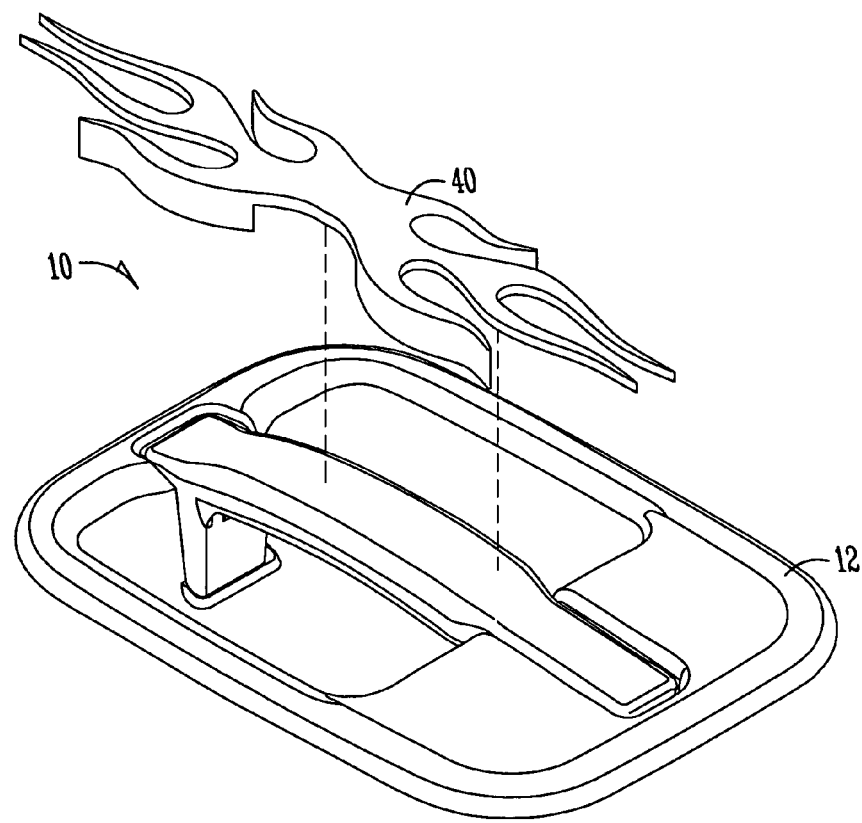
FIG. 4B shows how a generic decorative design member mates to an existing vehicle door handle.
Figure 5:
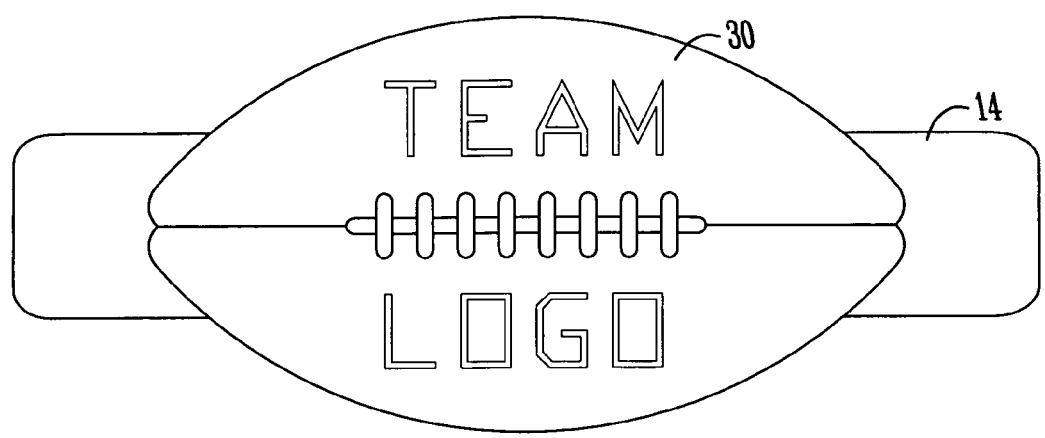
FIG. 5 shows a decorative design member configured as a logo affixed to a handle overlay.

Similarly, FIGS. 4A and 4B show a decorative design member 30 and a generic decorative design member 40 respectively configured to directly affix to a handle 12.

Figure 6A:
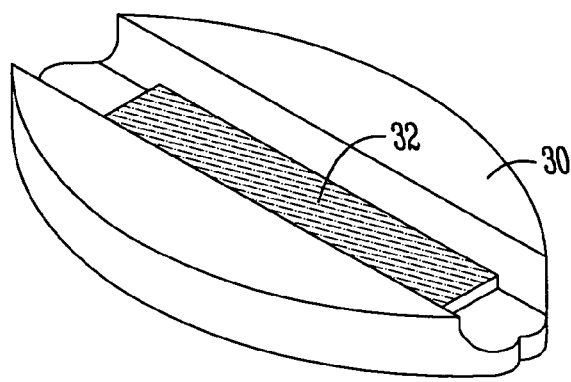
FIG. 6A shows a backside of a decorative design member which affixes to a handle overlay with double-sided tape.

One preferred method of affixing the decorative design member 30 to the handle overlay 14 is to use double-sided tape 32 between the decorative design member 30 and the handle overlay 14 as is commonly used in attaching or affixing trim to vehicles. It is also preferred that the decorative design member 30 and the generic decorative design member 40 of the current invention be configured so as to mate with the curvature or shape of the handle overlay 14 or the handle 12. This can be seen in FIG. 6A where the backside of the decorative design member 30 is shown. The decorative design member 30, 40 is preferred to be molded or cutout in such a way that allows the decorative design member 30, 40 to nest against the handle overlay 14 or the handle 12 so as to reduce open space between the junction of the decorative design member 30, 40 and the handle overlay 14 or the handle 12 to create a tighter more positive fit. In this way, the double-sided tape 32 is able to contact more surface area of both the backside of the decorative design member 30, 40 and the handle overlay 14 or the handle 12 to create a stronger affixation of the decorative design member 30, 40 to the handle overlay 14 or the handle 12.

Figure 6B:
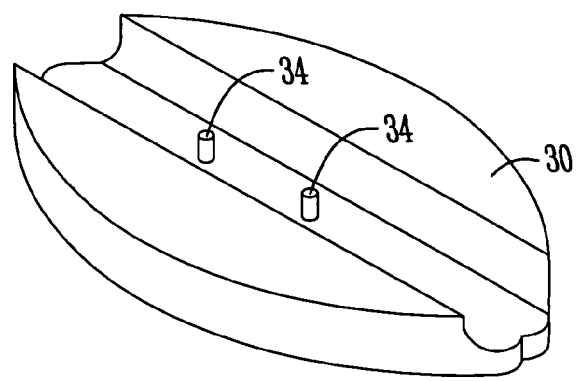
FIG. 6B shows a backside of a decorative design member which affixes to a handle overlay with pins.

Another preferred way to affix a decorative design member 30 to a handle overlay 14 is shown in FIG. 6B. This method of affixing the decorative design member 30 to the handle overlay 14 calls for one or more mounting pins 34 to extend from the backside of the decorative design member 30. The mounting pins are designed in such a way so as to extend through one or more mounting pin holes 16 as shown in FIG. 3B. The mounting pins 34 can be created from metal, plastic, or other rigid or semi-rigid material. In addition, the mounting pins 34 can be created as an extension or one piece with the decorative design member 30. Alternatively, the mounting pins 34 can be inserted into the decorative design member 30 so as to stay connected with the backside of the design member. In addition, a decorative design member 30 can be molded around mounting pins 34.

In the mounting pin 34 method of affixing the decorative design member 30 to the handle overlay 14, the mounting pins 34 are to be inserted through the mounting pin holes 16 so that the mounting pins 34 extend through the backside of the handle overlay 14. Then, the mounting pins 34 can be hammered, machined, bent over, melted down, or other method of enlarging or deforming the mounting pins 34 so that they can no longer pass back through the mounting pin holes 16 in the handle overlay 14. This creates a rigid affixation of the decorative design member 30 to the handle overlay 14. In addition to the foregoing, a decorative design member 30 can be affixed to a handle overlay 14 by adhesive, glue, bonding agent, cured resin, fusing, welding, screws, bolts, pins, rivets, and any other method of rigidly or semi-rigidly affixing one body to another.

Figure 7:
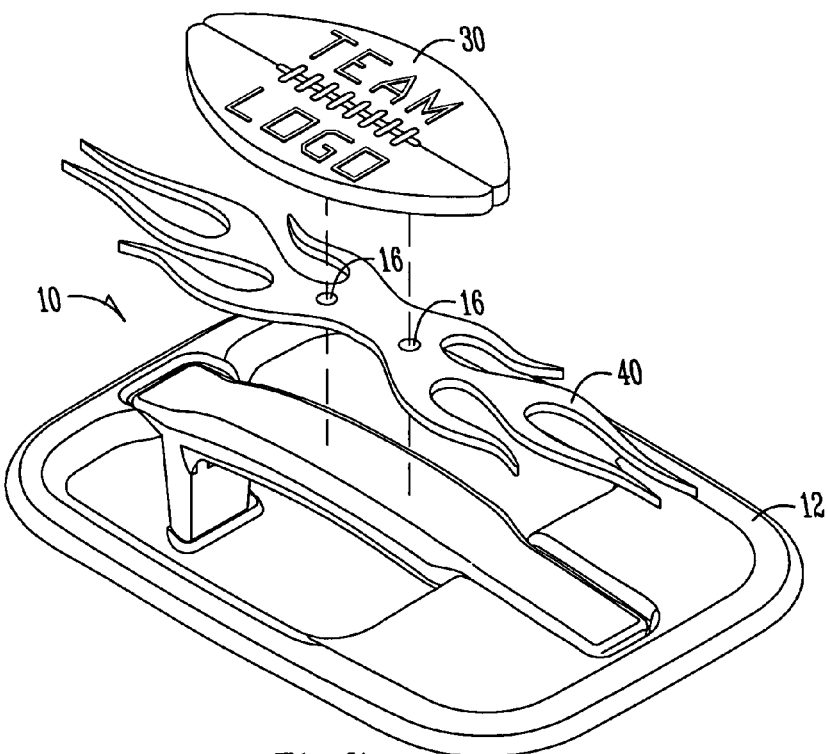
FIG. 7 shows a decorative design member configured as a logo attached to a generic decorative design member.
Figure 7A:
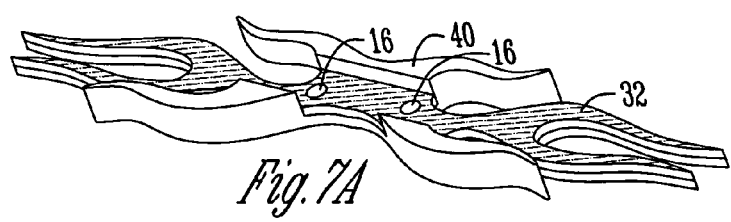
FIG. 7A shows a backside of a generic decorative design member which affixes to a handle overlay with double-sided tape.

Similarly, a generic decorative design member 40 as seen in FIG. 7, can be affixed to a handle overlay 14 or handle 12. A generic decorative design member 40 is a decorative design which does not specifically point to a certain product or endorsement as a decorative design member configured as a logo 30 does. A generic decorative design member 40 can be affixed to a handle overlay 14 or handle 12 in the same or similar methods as described above.

In addition, a decorative design member configured as a logo 30 can be affixed to a generic decorative design member 40 as described above, which can then in turn be affixed to a handle overlay 14 or handle 12.

In summation, a decorative design member configured as a logo 30 can be affixed directly to a handle overlay 14 or a handle 12, a generic decorative design member 40 can be affixed directly to a handle overlay 14 or a handle 12, or a decorative design member configured as a logo 30 can be affixed to a generic decorative design member 40 which can then be affixed to a handle overlay 14 or a handle 12. Once again, a preferred method of affixing a logo, decorative design member and handle overlay 14 or a handle 12 together is double-sided tape 32 or mounting pins 34 which mount through mounting pin holes 16. However, any other method of affixing the parts together can be used.

Figure 8:
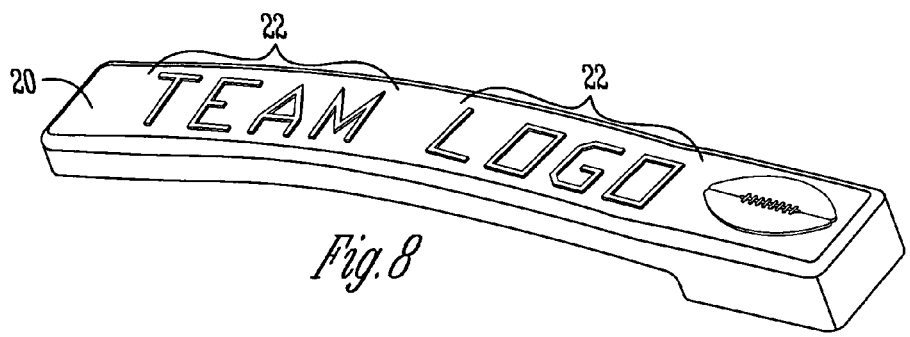
FIG. 8 shows a handle overlay in which a decorative design member which is configured as a logo is integral with a handle overlay.

Another embodiment of the current invention is shown in FIG. 8. The integral decorative design member configured with a logo 22 is integrated into an integrated handle overlay 20. In other words, the decorative design member configured with an integral logo 22 is integrated into the handle overlay by either being molded as one part with the handle overlay 20 or by being fused together by a means such as melting together, ultrasonic welding, or other similar type fusing methods.

Figure 9:
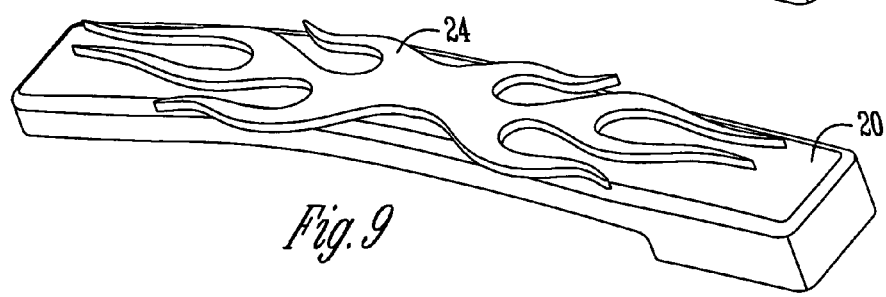
FIG. 9 shows a handle overlay in which a generic decorative design member is integral with a handle overlay.

In addition to having a decorative design member configured as a logo 22 integrated with a handle overlay 20, the invention can also have a generic integral decorative design member 24 integrated with a handle overlay 20 as in FIG. 9.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claim is:

1. An after market vehicle trim piece adapted to mount on a completely assembled vehicle door handle having an outer top surface with a perimeter edge and opposite sides, the trim piece comprising:
    a decorative design member having a front and back, with a channel formed in the back to receive the door handle in a nesting fashion;
    the channel having opposite sides and a bottom surface extending between the sides, whereby the bottom surface of the channel matingly engages the top surface of the handle; and
    the design member having an outer perimeter edge which is differently shaped from the perimeter edge of the top surface of the handle.

2. The vehicle trim piece of claim 1 wherein the decorative design member is a logo.

3. The vehicle trim piece of claim 1 wherein the decorative design member is affixed to the handle by a connecting member selected from the group consisting essentially of: double-sided tape, adhesive, glue, bonding agent, cured resin, fusing, welding, screws, bolts, pins, and rivets.

4. The vehicle trim piece of claim 1 wherein the vehicle door handle is part of a vehicle, the part selected from the group consisting essentially of a door, a trunk, a tailgate, a hatch, a hood, a storage box, or a top.

5. The vehicle trim piece of claim 1 wherein two or more decorative design members are affixed to a single handle.

6. The trim piece of claim 1 wherein the design member is non-magnetic.

7. The trim piece of claim 1 wherein the design member is fixed against movement relative to the handle.

8. The trim piece of claim 1 wherein the design member has an adhesive for adhering to the handle.

9. The trim piece of claim 1 wherein the channel has at least one open end whereby the handle extends beyond the open end of the channel.

10. The trim piece of claim 1 wherein the design member and the handle are in a matingly engaging layered arrangement.

* * * * *